United States Patent
Jin et al.

(10) Patent No.: US 10,401,998 B2
(45) Date of Patent: Sep. 3, 2019

(54) FLEXIBLE TOUCH DISPLAY PANEL AND FLEXIBLE TOUCH DISPLAY DEVICE

(71) Applicant: SHANGHAI TIANMA AM-OLED CO., LTD., Shanghai (CN)

(72) Inventors: Jian Jin, Shanghai (CN); Congyi Su, Shanghai (CN)

(73) Assignee: SHANGHAI TIANMA AM-OLED CO., LTD., Shanghai (CN)

( * ) Notice: Subject to any disclaimer, the term of this patent is extended or adjusted under 35 U.S.C. 154(b) by 23 days.

(21) Appl. No.: 15/726,252

(22) Filed: Oct. 5, 2017

(65) Prior Publication Data

US 2018/0032197 A1 Feb. 1, 2018

(30) Foreign Application Priority Data

Mar. 27, 2017 (CN) .......................... 2017 1 0187327

(51) Int. Cl.
| | |
|---|---|
| G06F 3/041 | (2006.01) |
| G02F 1/1333 | (2006.01) |
| G02F 1/1343 | (2006.01) |
| G06F 3/044 | (2006.01) |

(52) U.S. Cl.
CPC .......... G06F 3/0412 (2013.01); G02F 1/1343 (2013.01); G02F 1/13338 (2013.01); G06F 3/044 (2013.01); G06F 2203/04102 (2013.01)

(58) Field of Classification Search
CPC ............... G06F 3/0412; G06F 3/044; G06F 2203/04102; G02F 1/13338; G02F 1/1343
See application file for complete search history.

(56) References Cited

U.S. PATENT DOCUMENTS

| 2011/0193801 A1* | 8/2011 | Jung | ..................... G06F 3/0412 345/173 |
|---|---|---|---|
| 2018/0033834 A1* | 2/2018 | Jun | ........................ G06F 3/0412 |

FOREIGN PATENT DOCUMENTS

| CN | 102156563 A | | 8/2011 |
|---|---|---|---|
| CN | 103593086 A | | 2/2014 |
| CN | 101893958 | * | 11/2014 |
| CN | 101893958 A | | 11/2014 |
| CN | 104575698 A | | 4/2015 |
| CN | 105261712 A | | 1/2016 |
| CN | 106024840 A | | 10/2016 |
| JP | 2015011624 A | | 1/2015 |

\* cited by examiner

*Primary Examiner* — Lisa S Landis
(74) *Attorney, Agent, or Firm* — Alston & Bird LLP (57) ABSTRACT

A flexible touch display panel is provided, including: a flexible substrate, a driver layer, a light-emitting layer, an encapsulation layer, a touch layer. The touch layer is disposed on the encapsulation layer and includes a plurality of first/second touch electrodes disposed on one side, facing away from the flexible substrate, of the encapsulation layer and on a same layer. Each first touch electrode includes a plurality of first touch electrode blocks and first junctions for joining two adjacent first touch electrode blocks. Each second touch electrode includes a plurality of second touch electrode blocks and second junctions for joining two adjacent second touch electrode blocks. Each first junction and an associated second junction overlay in a direction perpendicular to the flexible substrate. The first/second touch electrodes are made of a conductive polymer material and formed by ink-jet printing or coating.

16 Claims, 11 Drawing Sheets

FLEXIBLE TOUCH DISPLAY PANEL AND FLEXIBLE TOUCH DISPLAY DEVICE

CROSS-REFERENCE TO RELATED APPLICATION

This application claims priority to Chinese patent application No. CN201710187327.8, filed on Mar. 27, 2017, which is incorporated by reference herein in its entirety.

TECHNICAL FIELD

The present disclosure relates to the display field, in particular, to a flexible touch display panel and flexible touch display device.

BACKGROUND

At present, to enable a touch function on a flexible display panel provided with an organic light-emitting diodes (OLED), a touch electrode is typically formed on one side of the OLED substrate. The touch electrode is typically made from materials such as indium tin oxide (ITO). There is only a limited amount of indium reserve in nature, making indium expensive. Meanwhile, an indium tin oxide electrode layer is generally formed by photoetching, thereby significantly manufacturing cost is also relatively high. In addition, indium tin oxide process requires annealing at high temperature which limits any low temperature processes. Furthermore, a conductive electrode formed from indium tin oxide is fragile and has poor flexibility, and thus is inapplicable to a curved or flexible touch screen.

SUMMARY

In view of the above, one of the embodiments of the present disclosure providing a flexible touch display panel includes:

a flexible substrate;

a driver layer, disposed on the flexible substrate and including a plurality of thin film transistors;

a light-emitting layer, disposed on the driver layer and includes a plurality of light-emitting units, the plurality of light-emitting units each are associated with more than one of the plurality of thin film transistors and are controlled by the more than one thin film transistors to emit light;

an encapsulation layer, disposed on the light-emitting layer to encapsulate the light-emitting layer; and a touch layer, disposed on the encapsulation layer, and includes a plurality of first touch electrodes and a plurality of second touch electrodes disposed on one side, facing away from the flexible substrate, of the encapsulation layer, and the plurality of first touch electrodes and the plurality of second touch electrodes are disposed on a same layer, the plurality of first touch electrodes each include a plurality of first touch electrode blocks and a plurality of first junctions for joining adjacent two first touch electrode blocks, and the plurality of first touch electrodes each are strip-like and extend along a first direction, and the plurality of first touch electrodes are arranged in parallel in a second direction;

the plurality of second touch electrodes each include a plurality of second touch electrode blocks and a plurality of second junctions for joining adjacent two second touch electrode blocks, and the plurality of second touch electrodes each are strip-like and extend in the second direction, and the plurality of second touch electrodes are arranged in parallel in the first direction, the first direction intersects the second direction; and the plurality of first junctions each and one of the plurality of second junctions overlay in a direction perpendicular to the flexible substrate, said first junction and said second junction are insulated from each other by one of a plurality of insulating pieces of an insulating layer disposed in the touch layer;

the plurality of first touch electrodes and the plurality of second touch electrodes consist of a conductive polymer material formed by ink-jet printing or coating.

Another aspect of the embodiments of the present disclosure provides a flexible touch display device, including the above flexible touch display panel.

Yet another aspect of the embodiments of the present disclosure provides a method for manufacturing a flexible touch display panel, including:

forming a flexible substrate;

forming a driver layer having a plurality of thin film transistors on the flexible substrate;

forming a light-emitting layer having a plurality of light-emitting units on one side, facing away from the flexible substrate, of the driver layer, and the plurality of light-emitting units each are associated with more than one of the plurality of thin film transistors, and are controlled to emit light by the more than one of the plurality of thin film transistor;

forming an encapsulation layer on one side, facing away from the flexible substrate, of the light-emitting layer, and the encapsulation layer is arranged to encapsulate the light-emitting layer; and forming a touch layer on one side, facing away from the flexible substrate, of the encapsulation layer by ink-jet printing or coating, and the touch layer comprises a plurality of first touch electrodes and a plurality of second touch electrodes disposed on the side, facing away from the flexible substrate, of the encapsulation layer, the plurality of first touch electrodes each include a plurality of first touch electrode blocks and a plurality of first junctions for joining every adjacent two first touch electrode blocks, the plurality of first touch electrodes each are strip-like and extend along a first direction, and the plurality of first touch electrodes are arranged in parallel in a second direction; the plurality of second touch electrodes each comprise a plurality of second touch electrode blocks and a plurality of second junctions for joining adjacent two second touch electrode blocks, the plurality of second touch electrodes each are strip-like and extend in the second direction, the plurality of second touch electrodes are arranged in parallel in the first direction, and the first direction intersects the second direction; the plurality of first junctions and the plurality of second junctions overlay in a direction perpendicular to the flexible substrate; and the plurality of first junctions each and one of the plurality of second junctions overlay in a direction perpendicular to the flexible substrate, said first junction and said second junction are insulated from each other by one of a plurality of insulating pieces of an insulating layer disposed in the touch layer.

In the flexible touch display panel and flexible touch display device provided by the present disclosure, the first touch electrodes and the second touch electrodes are made of a conductive polymer material and formed on the encapsulation layer by ink-jet printing or coating, ensuring touch stability of the flexible touch display panel when folded or bent. Meanwhile, the touch layer is manufactured by ink-jet printing or coating, instead of yellow-light etching in the related art so that the processing environment can be controlled more easily and the process consistency becomes better. Additionally, by ink-jet printing or coating, touch electrodes and insulating pieces can be formed without photomasks, thereby increasing the material utilization ratio, saving the costs and improving the manufacturing efficiency.

DETAILED DESCRIPTION

The present disclosure will be described below in detail with reference to the specific embodiments illustrated in the accompanying drawings. However, these embodiments are not intended to limit the present disclosure. Any changes in structures, methods or functions made by those skilled in the art based on these embodiments are within the scope of the present disclosure.

Example embodiments will be described more fully with reference to the accompanying drawings. However, example embodiments may be implemented in many forms and should not be construed as limited to the embodiments set forth herein. Rather, these embodiments make the present disclosure thorough and complete and fully convey the conception of example embodiments to those skilled in the art. The same reference numerals in the drawings denote the same or similar structures, and thus a description of the same reference numerals will not be repeated.

The characteristics, structures or features described herein may be combined in one or more embodiments in any suitable manner. In the following description, numerous specific details are set forth to give a full understanding of the embodiments of the disclosure. However, those skilled in the art will appreciate that the technical solutions of the present disclosure may be practiced without one or more of the specific details or practiced by other methods, components, materials, etc. In some cases, well-known structures, materials or operations are not shown or described in detail to avoid obscuring the present disclosure.

As used herein, "disposed at/on . . . " should be construed as including "disposed at/on . . . " directly or "disposed at/on . . . " indirectly.

The accompanying drawings of the present disclosure are used for illustrating only the relative positional relationship and the electric connection relationship. The thickness of a certain part is highlighted to facilitate understanding. The layer thickness in the accompanying drawings does not represent a ratio of actual layer thickness.

The present disclosure will be described in further detail with reference to the accompanying drawings and embodiments. It is to be understood that the specific embodiments set forth below are intended to explain and not to limit the present disclosure. It is to be noted that for ease of description, only a part related to the present disclosure rather than the whole structure is illustrated in the accompanying drawings. For the sake of clarity, the same reference numerals are used in different accompanying drawings.

Figure 1A:
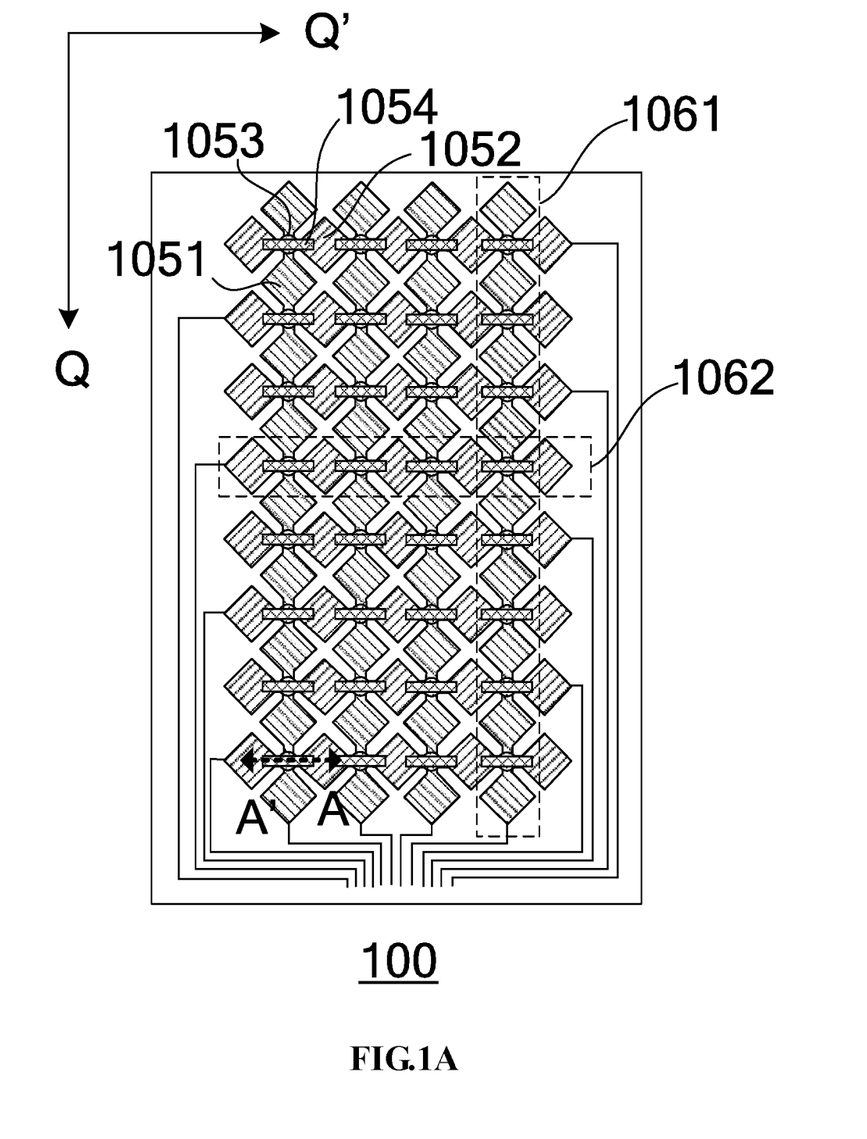
FIG. 1A is a top view illustrating a flexible touch display panel according to an embodiment of the present disclosure.
Figure 1B:
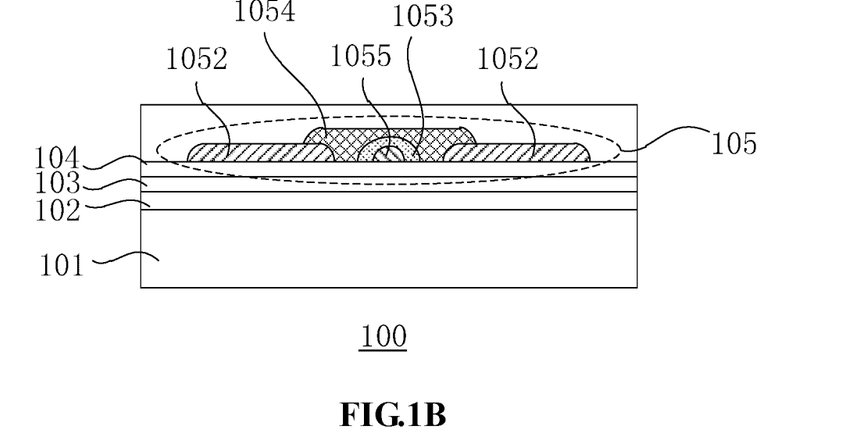
FIG. 1B is a cross sectional view of FIG. 1A along a cutting line AA'.

FIG. 1A is a top view illustrating a flexible touch display panel 100 according to an embodiment of the present disclosure. FIG. 1B is a cross sectional view of the flexible touch display panel 100 in FIG. 1A along the cutting line AA'. The flexible display panel 100 includes a flexible substrate 101, a driver layer 102 disposed on one side of the flexible substrate 101, a light-emitting layer 103 disposed on one side, facing away from the flexible substrate 101, of the driver layer 102, an encapsulation layer 104 disposed on the light-emitting layer 103 and a touch layer 105 disposed on the encapsulation layer 104.

For the embodiment of the present disclosure, the flexible substrate 101 may be flexible, that is, stretchable, foldable, bendable or curlable, so that the touch display panel 100 may be stretchable, foldable, bendable or curlable. The flexible substrate 101 may be formed from any suitable flexible insulating material, such as polyimide (PI), polycarbonate (PC), polyether sulfone (PES), polyethylene terephthalate (PET), polyethylene naphthalate (PEN), polyarylate (PAR), glass fiber reinforced plastic (FRP) and the like. The flexible substrate 101 may be transparent, translucent or opaque.

Figure 2:
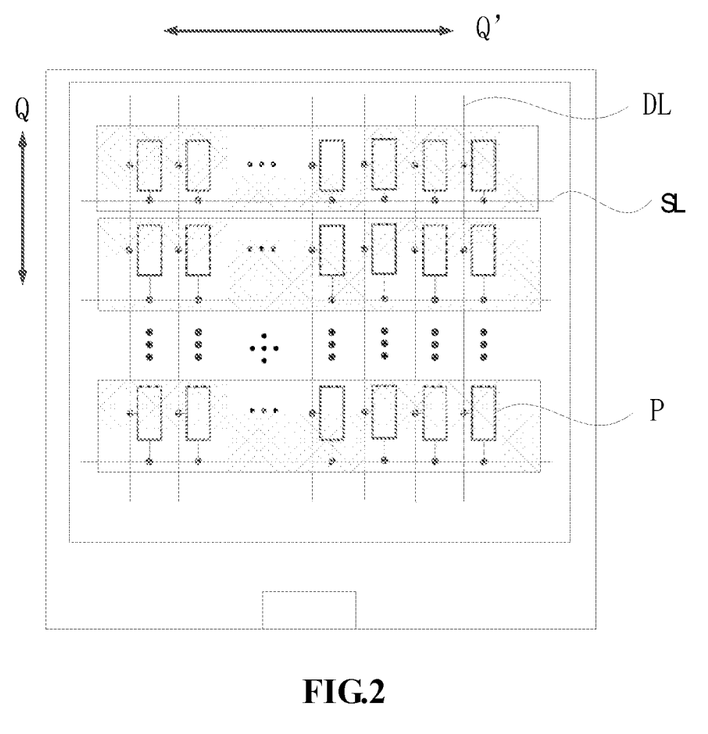
FIG. 2 is a schematic diagram illustrating another flexible touch display panel according to an embodiment of the present disclosure.

For the embodiment of the present disclosure, the driver layer 102 disposed on the flexible substrate 101 includes a plurality of thin film transistors. Each thin film transistor includes a semiconductor active layer, a gate, a source, a drain and an insulating layer (not shown in FIG. 1B) between these electrodes. The semiconductor active layer includes a source region and a drain region formed by doping N-type impurity ions or P-type impurity ions. A region between the source region and the drain region is a channel region in which no impurity is doped. Besides the thin film transistors, the driver layer 102 further includes a plurality of signal lines. Please refer to FIG. 2 for details. FIG. 2 is a schematic diagram illustrating a flexible touch display panel according to an embodiment of the present disclosure. Exemplarily, the driver layer 102 includes a plurality of pixel units P. Each of the plurality of pixel units P may include a pixel circuit composed of one or more thin film transistors and capacitors. For example, each of the plurality of pixel units P may include a pixel circuit composed of two thin film transistors and one capacitor, or include a pixel circuit composed of seven thin film transistors and one capacitor. The number of the thin film transistors and the number of the capacitors in each pixel unit are not specifically limited and can be set arbitrarily. The driver layer 102 further includes a plurality of scanning lines (SL) and a plurality of data lines (DL). The plurality of scanning lines SL and the plurality of data lines DL intersect to define the plurality of pixel regions P. Each of the plurality of scanning lines SL is electrically connected to gates of the thin film transistors of pixel units along the scanning line row. The other end of this scanning line is connected to a gate controller (not shown in FIG. 2) which turns on or off the thin film transistors. Each of the plurality of data lines DL is electrically connected to the sources or drains of the thin film transistors of pixel units along the driving line column. The other end of this data line is connected to an integrated chip (not shown in FIG. 2) which supplies data signals to the associated light-emitting unit. It is to be noted that the number of the scanning lines SL and the number of the data lines DL in the schematic diagram FIG. 2 are not limited in the present disclosure and can be designed according to actual needs.

For the embodiment of the present disclosure, the light-emitting layer 103 formed on the driver layer 102 includes an anode layer, a cathode layer and a light-emitting layer between the anode layer and the cathode layer. The anode layer includes a plurality of anodes. Each of the plurality of pixel units P is connected to a respective one of the plurality of anodes. For every light-emitting pixel unit P, the anode is electrically connected to the drains or sources of the thin film transistors in the driver layer. The light-emitting layer may be formed from a low-molecular-weight organic material or a high-molecular-weight organic material. The light-emitting layer includes an organic emission layer and may further include at least one of a hole injection layer (HIL), a hole transport layer (HTL), an electron transport layer (ETL) and an electron injection layer (EIL). That is, in addition to the organic emission layer, the light-emitting layer may further include various other functional layers.

For the embodiment of the present disclosure, the primary function of the encapsulation layer 104 formed on the light-emitting layer 103 is to protect the light-emitting layer and other thin layers from external moisture, oxygen, etc. The encapsulation layer 104 may include a structure in which inorganic layers and organic layers are stacked. The encapsulation layer 104 may use a laminated structure in which a plurality of inorganic layers and a plurality of organic layer are staggered. The structure of the encapsulation layer 104 is not limited in the present disclosure.

For this above embodiment, the touch layer 105 disposed on one side, facing away from the flexible substrate 101, of the encapsulation layer 104 includes a plurality of first touch electrodes 1061 and a plurality of second touch electrodes 1062. The first touch electrodes 1061 and the second touch electrodes 1062 are located on the same layer, and are both disposed on one side, facing away from the flexible substrate 101, of the encapsulation layer 104. Each of the first touch electrodes 1061 includes a plurality of first touch electrode blocks 1051 and a plurality of first junctions 1055 for joining two adjacent first touch electrode blocks 1051. Each of the first touch electrodes 1061 is strip-like and extends in a first direction Q, and the plurality of first touch electrodes 1061 are arranged in parallel along a second direction Q'. Each of the second touch electrodes 1062 includes a plurality of second touch electrode blocks 1052 and a plurality of second junctions 1054 for joining every adjacent two of the second touch electrode blocks 1052. Each of the second touch electrodes 1062 is strip-like and extends in the second direction Q' and the plurality of second touch electrodes 1062 are arranged in parallel along the first direction Q. The first direction Q intersects the second direction Q'. Intersection means that the first direction Q and the second direction Q' may be arranged in any manner except for being parallel to each other, for example intersecting at an angle of 90° or any other degrees, which are not limited herein. Each of the first junctions 1055 and an associated one of the second junctions 1054 overlay in a direction perpendicular to the flexible substrate 101. The touch layer 105 further includes an insulating layer. The insulating layer includes a plurality of insulating pieces 1053. Each of the insulating pieces 1053 is disposed at a position where one of the first junctions 1055 and an associated one of the second junctions 1054 overlay in the direction perpendicular to the flexible substrate 101 and between the first junction 1055 and the associated second junction 1054 so that each of the first junctions 1055 is insulated from the associated one of the second junctions 1054.

Figure 3:
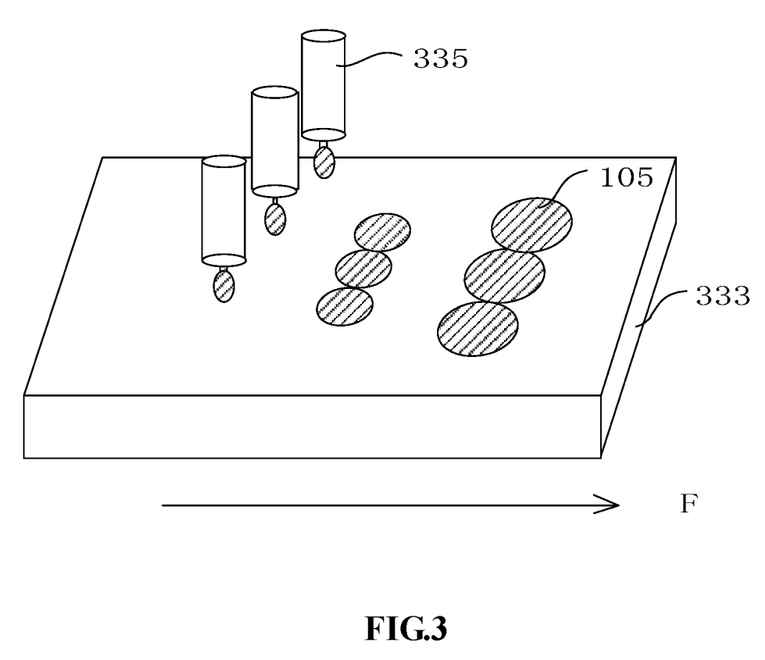
FIG. 3 is a schematic diagram illustrating a process of printing on a flexible display panel via ink-jet printing.

For the embodiment of the present disclosure illustrated in FIG. 1A and FIG. 1B, the first touch electrodes 1061 and the second touch electrodes 1062 are all made from a conductive polymer material and are formed by ink-jet printing or coating. Please refer to FIG. 3 for details. FIG. 3 is a schematic diagram illustrating a process of printing structures on a flexible display panel via ink-jet printing technique. A film layer 333 illustrates a structure of the flexible touch display panel before the touch electrodes are provided, in which the flexible substrate and other film layers (such as the aforementioned driver layer, light-emitting layer, encapsulation layer, etc.) formed on the flexible substrate have been provided. When the touch layer is formed via ink-jet printing or coating, generally, the film layer 333 is enabled to move in a specific direction F, and one or more print heads 335 (the number of the print heads is not limited) are configured to deposit materials for the touch layer on the film layer 333 via ink-jet printing or coating.

In the case where the encapsulation layer is a three-layer stack composed of an inorganic layer, an organic layer and another inorganic layer (in the present embodiment, the encapsulation layer is not limited to such a three-layer structure and may use another structure having a multilayer stack), the first inorganic layer is formed via chemical vapor deposition (CVD) or atomic layer deposition (ALD). The organic layer is provided on the first inorganic layer via ink-jet printing or coating after the first inorganic layer is provided. After the organic layer is provided, the second inorganic layer is provided on the organic layer via CVD or ALD. Since the encapsulation layer is used to protect the organic light-emitting layer from water vapor or oxygen, CVD or ALD is generally applied in a vacuum environment and ink-jet printing or coating is generally used in a pure nitrogen environment, so as to control the content of water vapor and oxygen to the minimum.

Conventionally, a touch layer is generally manufactured via photolithography processes (also referred to as yellow-light etching processes). The yellow-light etching process includes: step 1, cleaning; step 2, baking; step 3, photoresist coating; step 4, the first baking (pre-baking) after the photoresist coating, where the baking temperature is generally 90° C. to 120° C.; step 5, exposure with a short wavelength; step 6, development of photoresist; step 7, the second baking (post-baking) after the photoresist coating, where the baking temperature is generally 120° C. to 160° C.; step 8, dry etching; step 9, removing the photoresist; and step 10 cleaning before the next process. The inventor has found from research on the existing technical processes that many negative effects occur if the touch layer is manufactured through the aforementioned yellow-light etching process after the encapsulation layer has been manufactured through the aforementioned deposition processes (CVD or ALD+ ink-jet printing or coating). The negative effects are listed as follows:

First, the processing environment is difficult to control.

As described above, in the existing yellow-light etching processes are exposed in air, not only the encapsulation layer manufactured in a vacuum environment or in a nitrogen environment the organic light-emitting layer under the encapsulation layer are also adversely affected by oxygen. In particular, the existing yellow-light etching process includes cleaning, photoresist coating, pre-baking and post-baking. During the cleaning step, water vapor has a negative impact on the encapsulation layer and the organic light-emitting layer. During the photoresist coating step, water contained in the photoresist also has a negative impact on the encapsulation layer and the organic light-emitting layer. During the pre-baking and post-baking steps, processing temperature reaches 80° C. and above. Especially during the post-baking step, the processing temperature exceeds 120° C. This is far beyond the temperature that the inorganic layer and the organic layer in the encapsulation layer can bear, causing serious damage to the finished encapsulation layer and underlayers. The damage to the encapsulation layer further causes the "protective layer" within the underneath organic light-emitting layer to fail exposing the organic light-emitting layer to water vapor and oxygen, followed by corrosion.

Second, consistency of the processes is poor.

As described above, if CVD/ALD and ink-jet printing/coating are adopted for manufacturing the encapsulation layer, two sets of processing equipment are required. After the encapsulation layer is fabricated, the touch layer is manufactured through the yellow-light etching process subsequently, which adds cost. Even if yellow light tools are used for the yellow-light etching in the processes before the encapsulation layer is manufactured (e.g., process for manufacturing the thin film transistors in the driver layer) and are used again to manufacture the touch layers, these tools still need to be moved, thus inevitably increasing the processing cost.

Third, the tatk time of the process is reduced.

As can be seen from the introduction of the yellow-light etching process described above, in the yellow-light etching process, any layer with a pattern needs to be prepared through multiple steps. Moreover, when the encapsulation layer with multiple structures is manufactured, the aforementioned steps need to be repeated. Accordingly, the tatk time of the process (the production efficiency) is decreased.

In contrast, ink-jet printing or coating has many advantages over the existing yellow-light etching process in this area. First, ink-jet printing or coating is an additive process in which ink-jet printing or coating material is only deposited at desired positions, thus avoiding material waste and environmental pollution compared with the existing yellow-light etching process; and furthermore, after the encapsulation layer has been manufactured, if the touch layer is provided on the encapsulation layer through ink-jet printing or coating, the processing environment can be better controlled, thereby avoiding damage to the encapsulation layer caused by the manufacturing process of the touch layer (referring to description in the aforementioned "First, the processing environment is difficult to control."). Second, after the encapsulation layer has been manufactured, if the touch layer is provided on the encapsulation layer through ink-jet printing or coating, no device is necessary to be added additionally, thereby reducing the costs and improving the consistency of the processes (referring to description in the aforementioned "Second, the consistency of the processes is poor."). Third, ink-jet printing or coating is controlled by the numerical control technique and is less complex than the yellow-light etching process, thereby improving the tatk time of the process. Last of all, ink-jet printing or coating is a non-contact technique, thereby avoiding contact between different materials during deposition and thus greatly reducing damage to the "fragile and sensitive" encapsulation layer during material deposition.

Optionally, the conductive polymer material for forming the touch layer, applied in the ink-jet printing or coating, is a composite of silver nanowires and PEDOT:PSS or a composite of carbon nanowires and PEDOT:PSS. Optionally, the mass percentage of silver nanowires or carbon nanowires in the conductive polymer material is x % and the mass percent of PEDOT:PSS is (100−x)%, where x=0.1~60. In this case, preferably, the thickness of the touch layer is 10 nm~400 nm. Alternatively, the conductive polymer material may be one of or a combination of two or more of PEDOT, silver nanowires and carbon nanotubes.

Figure 4A:
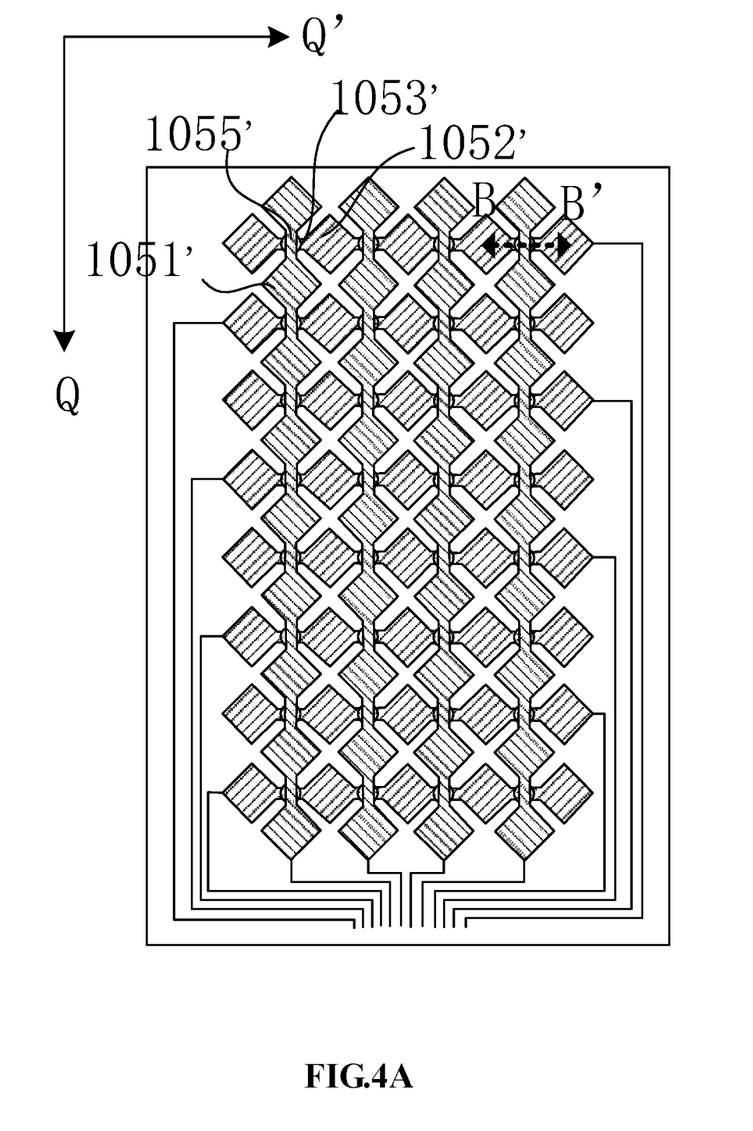
FIG. 4A is a top view illustrating another flexible touch display panel according to an embodiment of the present disclosure.
Figure 4B:
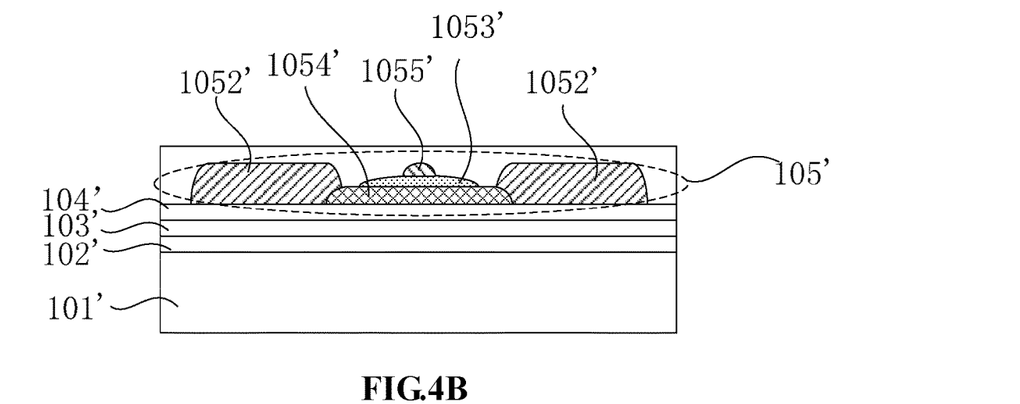
FIG. 4B is a cross sectional view of FIG. 4A along a cutting line BB'.

For the embodiment of the present disclosure illustrated in FIG. 1A and FIG. 1B, the plurality of first touch electrodes 1061 and the plurality of second touch electrodes 1062 in the touch layer 105 are disposed directly on one side, facing away from the flexible substrate 101, of the encapsulation layer 104. The plurality of first junctions 1055 are disposed directly on one side, facing away from the flexible substrate 101, of the encapsulation layer 104 and are configured to connect two adjacent first touch electrode blocks 1051 disposed directly on the encapsulation layer 104. Each of the insulating pieces 1053 is disposed on and overlays an associated one of the first junctions 1055. Each of the second junctions 1054 is disposed on and overlays the associated one of the insulating pieces 1053. However, for the present disclosure, the film layer structure of the touch layer is not limited to the embodiment illustrated in FIG. 1A and FIG. 1B, and other film layer structures may be adopted. For example, FIG. 4A and FIG. 4B illustrate another flexible touch display panel according to an embodiment of the present disclosure. FIG. 4B is a cross sectional view of FIG. 4A along the cutting line BB'. Since the overall structure of this flexible touch display panel is generally similar to that illustrated FIG. 1A and FIG. 1B, related disclosures can be understood with reference to the aforementioned description. Furthermore, reference numerals used in FIG. 4A and FIG. 4B are the same as those mentioned above, and only technical features different from those illustrated in FIG. 1A and FIG. 1B will be described herein in detail.

As illustrated in FIG. 4A and FIG. 4B, a plurality of first touch electrode blocks 1051' and a plurality of second touch electrode blocks 1052' are disposed directly on one side, facing away from a flexible substrate 101', of an encapsulation layer 104'. Similarly, a plurality of second junctions 1054' are disposed directly on one side, facing away from the flexible substrate 101', of the encapsulation layer 104'. Additionally, to achieve electric connections between adjacent second touch electrode blocks 1052', each of the second touch electrode blocks 1052' at least partially covers an associated one of the second junctions 1054' for direct contact. Each of the insulating pieces 1053' is disposed on one side, facing away from the flexible substrate 101', of the associated one of the second junctions 1054'. Meanwhile, to achieve electric connections between multiple adjacent first touch electrode blocks 1051' in the first direction Q, each of the first junctions 1055' is disposed on the associated one of the insulating pieces 1053'. It is to be noted that although the touch layer 105' of the present embodiment has a different film layer structure, preferably, the touch layer 105' is still formed by ink-jet printing or coating.

It is to be noted that, as described in the previous embodiment, the first touch electrode blocks 1051' and the second touch electrode blocks 1052' are all formed from a conductive polymer material by ink-jet printing or coating. In addition, the insulating layer (the plurality of insulating pieces 1053') may also be formed by ink-jet printing or coating.

Figure 5:
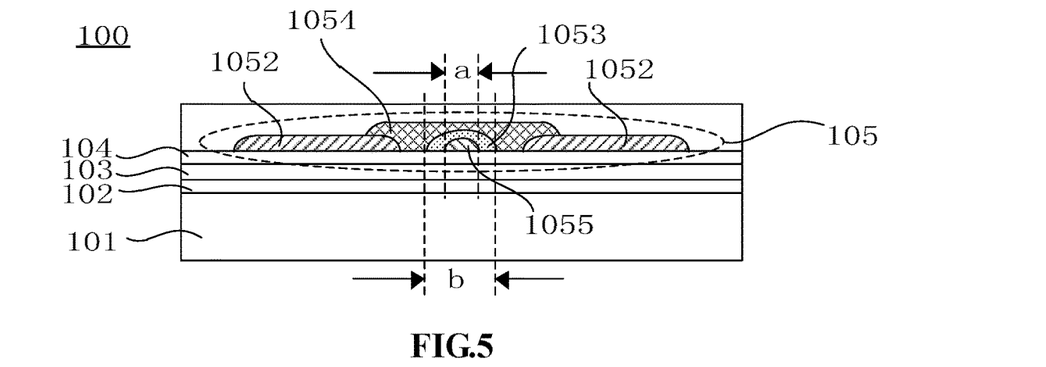
FIG. 5 is a cross sectional view illustrating a flexible touch display panel according to an embodiment of the present disclosure.

Referring to FIG. 5, FIG. 5 also illustrates a flexible touch display panel according to an embodiment of the present disclosure. The flexible touch display panel illustrated in FIG. 5 and that illustrated in FIG. 1B are the same in terms of structure, and new reference numerals "a" and "b" are added in FIG. 5. In FIG. 5, the first junction 1055 has a perpendicular projection onto the flexible substrate 101. The projection has a width. It is specified herein that the width, in the second direction Q', of the projection of the first junction 1055 onto the flexible substrate 101 is linewidth "a" of the first junction 1055. Similarly, the insulating piece 1053 has a perpendicular projection onto the flexible substrate 101. The projection of the insulating piece 1053 has an outer width. It is specified herein that the outer width, in the second direction Q', of the projection of the insulating piece 1053 onto the flexible substrate 101 is linewidth "b" of the insulating piece 1053. To ensure that a controllable minimum linewidth in the touch layer is formed on the encapsulation layer 104 by ink-jet printing or coating and to ensure that no electric connection is formed between the first touch electrode block 1051 and the second touch electrode block 1052, in other words, to avoid electric connection at the position where the first junction 1055 intersects the second junction 1054, the linewidth "b" should be greater than the linewidth "a" and both the linewidth "b" and the linewidth "a" should be greater than or equal to 1 μm.

Figure 6:
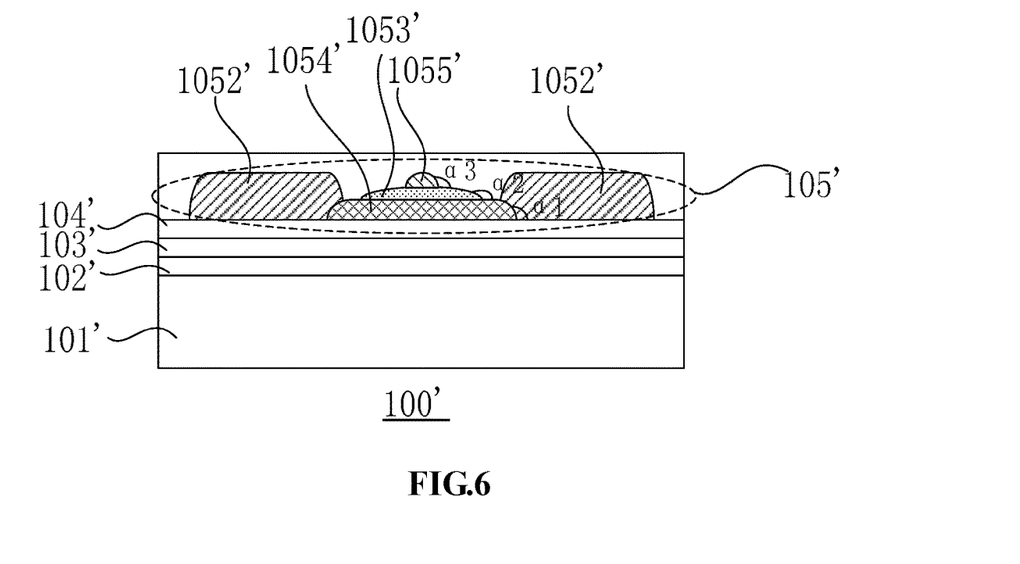
FIG. 6 is a cross sectional view illustrating a flexible touch display panel according to an embodiment of the present disclosure.

Referring to FIG. 6, FIG. 6 also illustrates a flexible touch display panel according to an embodiment of the present disclosure. The flexible touch display panel illustrated in FIG. 6 and that illustrated in FIG. 4B are the same in terms of the structure, and new reference numerals $\alpha 1$, $\alpha 2$ and $\alpha 3$ are added in FIG. 6. Specifically, the parts in FIG. 6 which is the same as that in FIG. 4B will not be repeated, and the meanings and functions of $\alpha 1$, $\alpha 2$ and $\alpha 3$ will be described in detail. The second touch electrode block 1052' and the second junction 1054' are both disposed directly on one side of the encapsulation layer 104'. The end of the second touch electrode block 1052' is disposed at least partially on the terminal of the second junction 1054'. The second touch electrode block 1052' and the second junction 1054' have a contact surface. The included angle between the contact surface and the encapsulation layer 104' is the first contact angle $\alpha 1$. The included angle between one side surface, facing away from the second junction 1054', of the end of the insulating piece 1053' and the second junction 1054' is the second contact angle $\alpha 2$. The included angle between one side surface, facing away from the second junction 1054', of the end, in the second direction, of the first junction 1055' and the insulating piece 1053' is the third contact angle $\alpha 3$. The inventor has found from experiments that increased contact angles between the film layers are more advantageous for the ink-jet printing or coating process to control the minimum linewidths of the film layers (electrode blocks and contact pieces) more precisely. Optionally, the third contact angle $\alpha 3$ is designed to be greater than the second contact angle $\alpha 2$ and the second contact angle $\alpha 2$ is designed to be greater than the first contact angle $\alpha 1$. This facilitates the control and optimal design of linewidths of various film layers in the stack in the touch layer. Additionally, it is to be noted that since ink-jet printing or coating is applied directly to the encapsulation layer, if the encapsulation layer includes multiple film layers, e.g., one organic layer is sandwiched between two inorganic layers, then ink-jet printing or coating is applied directly to the inorganic layer to manufacture the touch layer. However, as illustrated in FIG. 3, when the print head 335 prints or coats a polymer material or another material used for manufacturing the touch layer by ink-jet printing or coating on the surface of the inorganic layer, the contact angle between the ink-jet printing or coating material and the inorganic layer is generally small. A too small contact angle is disadvantageous for the control of the linewidth. Therefore, preferably, each of the first contact angle $\alpha 1$, the second contact angle $\alpha 2$ and the third contact angle $\alpha 3$ is within a range from 5° to 90°, including the endpoints.

It is to be noted that in the aforementioned embodiments of the present disclosure, the shape of each touch electrode block is, but is not limited to, a rhombus. Specifically, the shape of each first touch electrode block and each second touch electrode block may also be any one of a square, a circle, a triangle and a rectangle.

It is to be noted that, as illustrated in FIG. 2, the direction in which each gate scanning line SL extends is the second direction Q' and the direction and each data line DL extends in the first direction Q. The directions are not limited herein. For example, the direction in which each gate scanning line SL extends may be the first direction Q and the direction in which each data line DL extends may be the second direction Q'.

It is to be noted that in the aforementioned embodiments of the present disclosure, the flexible touch display panel further includes a thin film covering layer on one side, facing away from the flexible substrate 101, of the touch layer 105. The thin film covering layer is configured to protect the touch layer 105. Furthermore, the flexible touch display panel further includes a polarizer layer. The polarizer layer may include one or more polarizers and is disposed on one side, facing away from the flexible substrate, of the thin film covering layer.

Figure 7A:
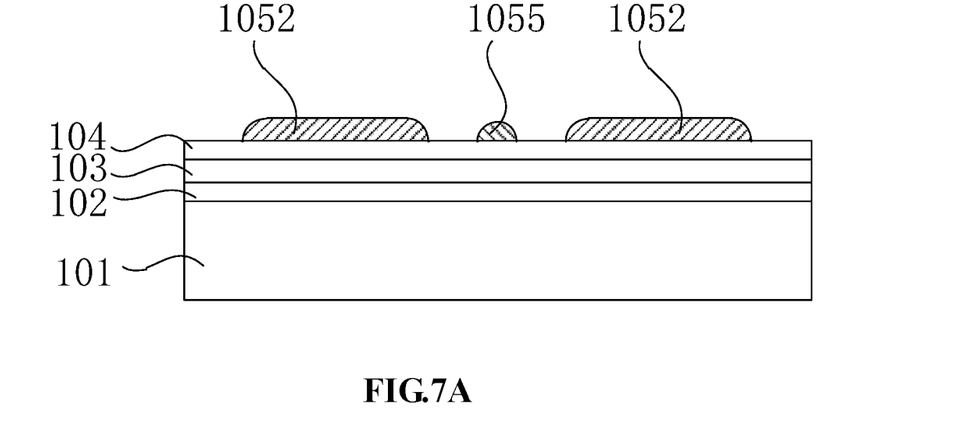
FIG. 7A to FIG. 7C illustrate cross sectional views during a process for manufacturing a flexible touch display panel according to an embodiment of the present disclosure.
Figure 7B:
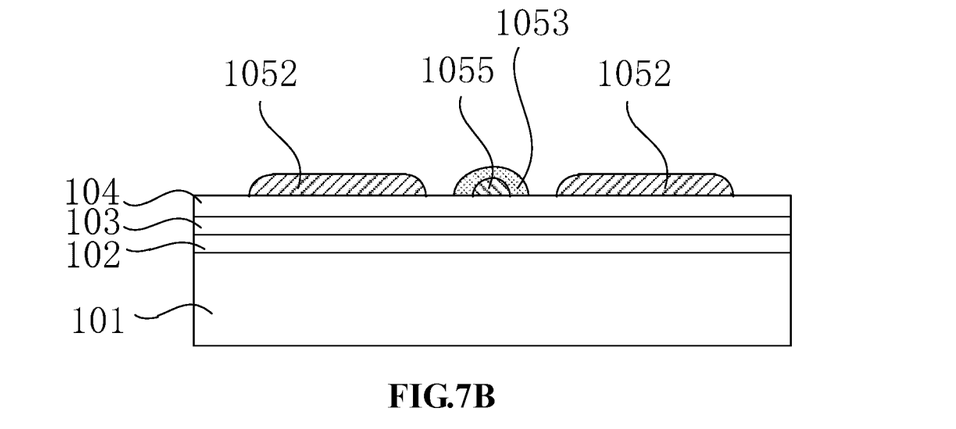
Figure 7C:
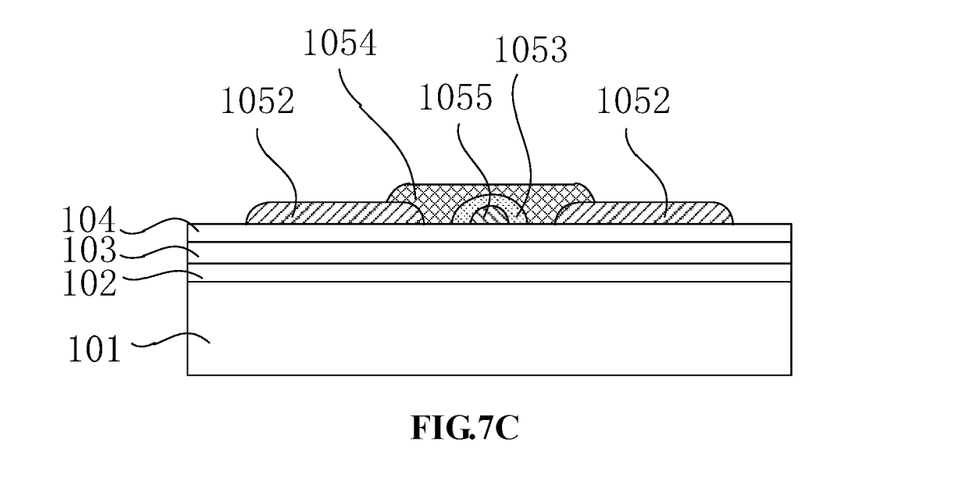
Figure 8A:
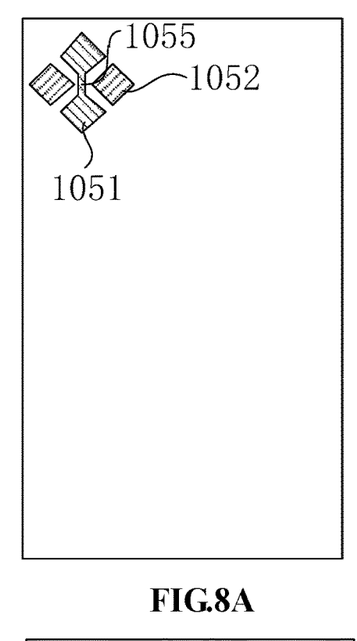
FIG. 8A to FIG. 8C illustrate tops views during the process for manufacturing the flexible touch display panel corresponding to FIG. 7A to FIG. 7C.
Figure 8B:
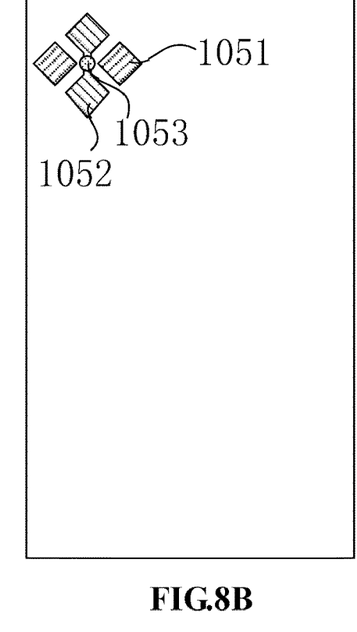
Figure 8C:
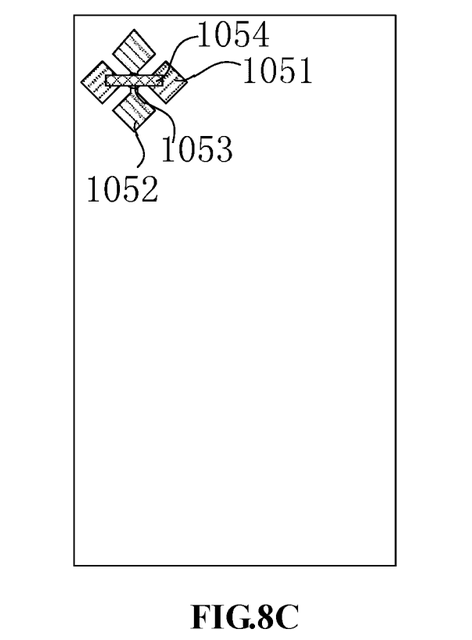

FIG. 7A to FIG. 7C and FIG. 8A to FIG. 8C illustrate a method for manufacturing a flexible touch display panel according to an embodiment of the present disclosure. FIG. 7A to FIG. 7C are cross sectional views and FIG. 8A to FIG. 8C are top views respectively. It is to be noted that each of FIG. 7A to FIG. 7C and FIG. 8A to FIG. 8C exemplarily illustrates a pair of first touch electrode blocks and/or a pair of second touch electrode blocks on the flexible substrate, without depicting the manufacturing process for all touch electrode blocks on the entire flexible touch display panel.

Specifically, as illustrated in FIG. 7A and FIG. 8A, a plurality of first touch electrodes and a plurality of second touch electrodes are formed on one side, facing away from the flexible substrate 101, of an encapsulation layer 104 by ink-jet printing or coating. Each of the plurality of first touch electrodes includes a plurality of first touch electrode blocks 1051 and a plurality of first junctions 1055 for joining two adjacent first touch electrode blocks 1051. Each of the plurality of second touch electrodes includes a plurality of second touch electrode blocks 1052. As illustrated in FIG. 7B and FIG. 8B, the insulating piece 1053 is formed on one side, facing away from the flexible substrate 101, of the associated one of the plurality of first junctions 1055 by ink-jet printing or coating. The insulating piece 1053 covers the first junction 1055. As illustrated in FIG. 7C and FIG. 8C, the second junction 1054 is formed on one side, facing away from the flexible substrate 101, of the insulating piece 1053 by ink-jet printing or coating. The second junction 1054 joins two adjacent second touch electrode blocks 1052.

Figure 9A:
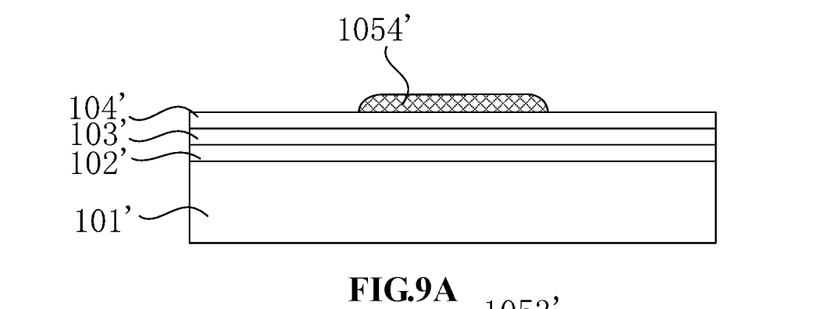
FIG. 9A to FIG. 9C illustrate cross sectional views during a process for manufacturing a flexible touch display panel according to an embodiment of the present disclosure.
Figure 9B:
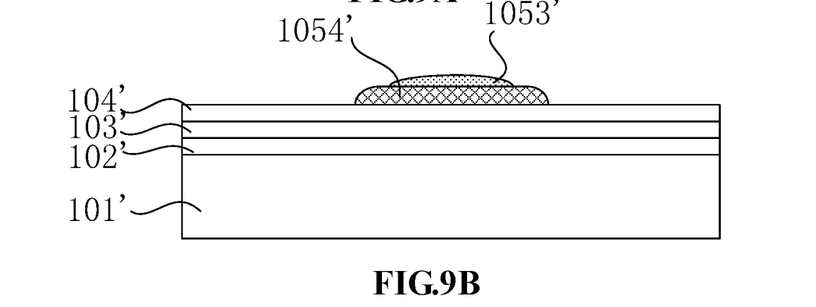
Figure 9C:
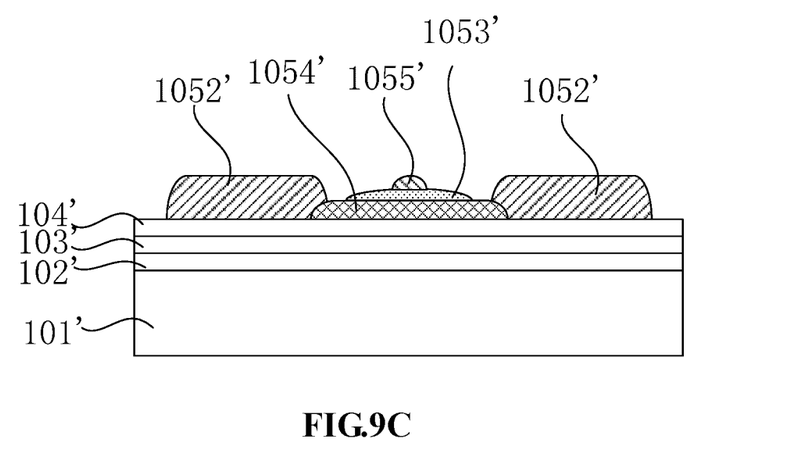
Figure 10A:
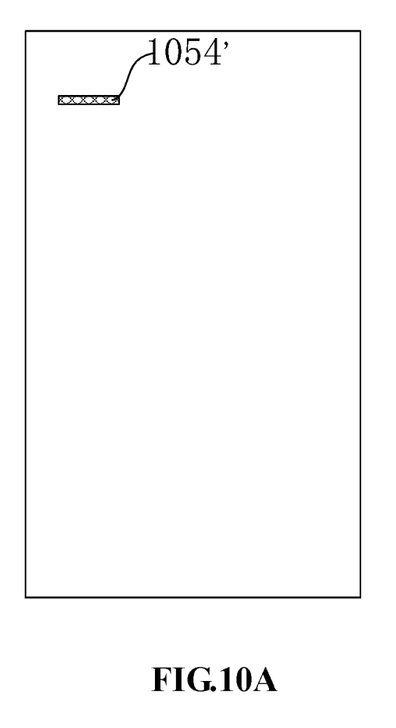
FIG. 10A to FIG. 10C illustrate top views of during a process for manufacturing the flexible touch display panel corresponding to FIG. 9A to FIG. 9C.
Figure 10B:
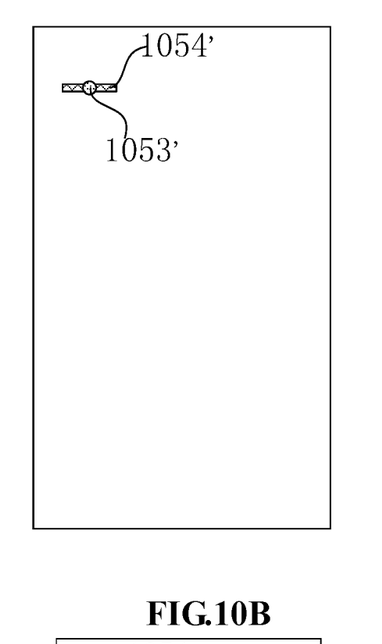
Figure 10C:
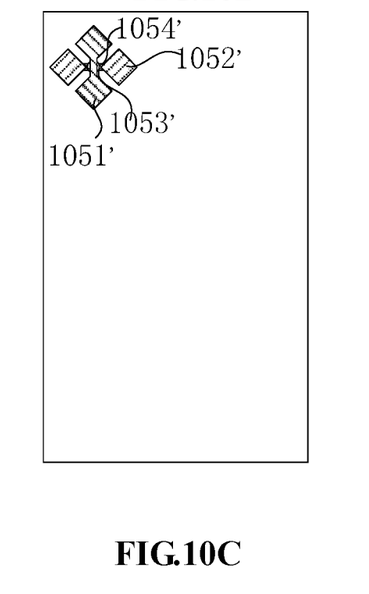

FIG. 9A to FIG. 9C and FIG. 10A to FIG. 10C illustrate another method for manufacturing a flexible touch display panel according to an embodiment of the present disclosure. FIG. 9A to FIG. 9C are cross sectional views and FIG. 10A to FIG. 10C are the respective top views. FIG. 10A, FIG. 10B and FIG. 10C correspond to FIG. 9A, FIG. 9B and FIG. 9C respectively. It is to be noted that each of FIG. 9A to FIG. 9C and FIG. 10A to FIG. 10C exemplarily illustrates a pair of first touch electrode blocks and/or a pair of second touch electrode blocks on the flexible substrate, without depicting the manufacturing process for all touch electrode blocks on the entire flexible touch display panel.

Specifically, first, as illustrated in FIG. 9A and FIG. 10A, the second junction 1054' is formed on one side, facing away from the flexible substrate 101', of the encapsulation layer 104' by ink-jet printing or coating. Second, as illustrated in FIG. 9B and FIG. 10B, the insulating piece 1053' is formed on one side, facing away from the flexible substrate 101', of the second junction 1054' by ink-jet printing or coating. The insulating piece 1053' at least partially covers an associated one of the plurality of second junctions 1054'. Last of all, as illustrated in FIG. 9C and FIG. 10C, a plurality of first touch electrode blocks 1051' and a plurality of second touch electrode blocks 1052' are formed on the flexible substrate 101' and on one side, facing away from the flexible substrate 101', of at least part of the second junction 1054' by ink-jet printing or coating, and the first junction 1055' is formed on one side, facing away from the flexible substrate 101, of the insulating piece 1053' by ink-jet printing or coating.

Figure 11:
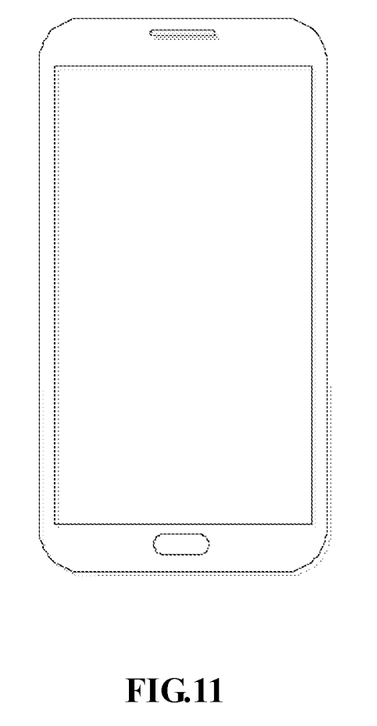
FIG. 11 illustrates a flexible touch display device according to an embodiment of the present disclosure.

FIG. 11 illustrates a flexible touch display device according to an embodiment of the present disclosure. The flexible touch display device may be a mobile phone as illustrated in FIG. 11 or a touch device such as a computer and the like. Specifically, in FIG. 11, the flexible touch display device is a "straight" mobile phone. The mobile phone may be bent or curled into a desired shape or folded in a desired manner according to user likes. The shape of the mobile phone is not limited herein.

It is to be noted that the above are only preferred embodiments of the present disclosure and the technical principles used therein. It will be understood by those skilled in the art that the present disclosure is not limited to the specific embodiments described herein. Those skilled in the art can make various apparent changes, modifications and substitutions without departing from the scope of the present disclosure. Therefore, while the present disclosure has been described in detail via the above-mentioned embodiments, the present disclosure is not limited to the above-mentioned embodiments and may include more other equivalent embodiments without departing from the concept of the present disclosure. The scope of the present disclosure is determined by the scope of the appended claims.

It will be understood that although this specification is described in terms of embodiments, not every embodiment includes only one independent technical solution. Such description mode of the specification is merely for the sake of clarity, and those skilled in the art should regard the specification as a whole. The technical solutions in the embodiments may also be appropriately combined to form other embodiments which will be understood by those skilled in the art.

A series of detailed descriptions set forth above are merely illustrative of the feasible embodiments of the present disclosure and are not intended to limit the scope of the present disclosure. Equivalent embodiments or alterations made without departing from the spirit of the present disclosure are within the scope of the present disclosure.

What is claimed is:

1. A flexible touch display panel, comprising:
   a flexible substrate;
   a driver layer, wherein the driver layer is disposed on the flexible substrate and comprises a plurality of thin film transistors;
   a light-emitting layer, wherein the light-emitting layer is disposed on the driver layer and comprises a plurality of light-emitting units, wherein each of the plurality of light-emitting units is associated with more than one of the plurality of thin film transistors, and is controlled to emit light by more than one of the plurality of thin film transistors;
   an encapsulation layer, disposed on the light-emitting layer to encapsulate the light-emitting layer; and
   a touch layer, disposed on the encapsulation layer, wherein the touch layer comprises a plurality of first touch electrodes and a plurality of second touch electrodes disposed on one side, facing away from the flexible substrate, of the encapsulation layer, wherein the plurality of first touch electrodes and the plurality of second touch electrodes are disposed on a same layer,
   wherein the plurality of first touch electrodes each comprise a plurality of first touch electrode blocks and a plurality of first junctions for joining two adjacent first touch electrode blocks; wherein the plurality of first touch electrodes each are strip-like and extend in a first direction, and the plurality of first touch electrodes are arranged in parallel along a second direction;
   wherein the plurality of second touch electrodes each comprise a plurality of second touch electrode blocks and a plurality of second junctions for joining two adjacent second touch electrode blocks, wherein the plurality of second touch electrodes each are strip-like and extend in the second direction, and the plurality of second touch electrodes are arranged in parallel along the first direction, wherein the first direction intersects the second direction; and
   wherein the plurality of first junctions each and one of the plurality of second junctions overlay in a direction perpendicular to the flexible substrate, wherein said first junction and said second junction are insulated from each other by one of a plurality of insulating pieces of an insulating layer disposed in the touch layer;
   wherein the plurality of first touch electrodes and the plurality of second touch electrodes consist of a conductive polymer material formed by ink-jet printing or coating,
   wherein the conductive polymer material is either a composite of silver nanowires and PEDOT:PSS or a composite of carbon nanowires and PEDOT:PSS; and
   wherein a mass percent of silver nanowires or carbon nanowires in the conductive polymer material is x % and a mass percent of PEDOT:PSS is (100−x)%, wherein x=0.1~60.

2. The flexible touch display panel according to claim 1, wherein the plurality of first touch electrodes and the plurality of second touch electrodes are disposed directly on a surface of the side, facing away from the flexible substrate, of the encapsulation layer, the plurality of first junctions are disposed directly on the side, facing away from the flexible substrate, of the encapsulation layer, each of the plurality of insulating pieces is disposed on and covers one of the plurality of first junctions, and each of the plurality of second junctions is disposed on and covers one of the plurality of insulating pieces.

3. The flexible touch display panel according to claim 2, wherein a linewidth in the second direction of the plurality of first junctions each is a, and a linewidth of the insulating piece is b, wherein a and b are both greater than 1 micron and b is greater than a.

4. The flexible touch display panel according to claim 1, wherein the plurality of first touch electrodes and the plurality of second touch electrodes are disposed directly on the side, facing away from the flexible substrate, of the encapsulation layer, the plurality of second junctions are disposed directly on the side, facing away from the flexible substrate, of the encapsulation layer, each of the plurality of insulating pieces is disposed on and at least partially covers one of the plurality of second junctions, and each of the plurality of first junctions is disposed on one side, facing away from the plurality of second junctions, of one of the plurality of insulating pieces.

5. The flexible touch display panel according to claim 4, wherein the plurality of second touch electrode blocks each is disposed at least partially directly on one of the plurality of second junctions at a position where the second touch electrode block connects the second junction, an included angle between the encapsulation layer and a contact surface between each of the plurality of second touch electrode blocks and one of the plurality of second junctions is a first contact angle, an included angle between a side surface, facing away from each of the plurality of second junctions, of an end of one of the plurality of insulating pieces and the plurality of second junctions is a second contact angle, and an included angle between a side surface, facing away from the plurality of second junctions, of an end, in the second direction, of one of the plurality of first junctions and the plurality of insulating pieces is a third contact angle, wherein the third contact angle is greater than the second contact angle and the second contact angle is greater than the first contact angle.

6. The flexible touch display panel according to claim 5, wherein the third contact angle, the second contact angle and the first contact angle are in a range from 5° to 90°, including endpoints.

7. The flexible touch display panel according to claim 1, wherein shapes of the plurality of first touch electrode blocks and the plurality of second touch electrode blocks are rhombus, squares, circles, triangles or rectangles.

8. The flexible touch display panel according to claim 1, wherein a thickness of the touch layer is 10 nm~400 nm.

9. The flexible touch display panel according to claim 1, wherein the driver layer comprises a plurality of data lines and a plurality of gate scanning lines, wherein the plurality of data lines extend in the first direction and are arranged in parallel along the second direction, and the plurality of gate scanning lines extend in the second direction and are arranged in parallel along the first direction.

10. The flexible touch display panel according to claim 1, further comprising a thin film covering layer arranged to cover the touch layer.

11. The flexible touch display panel according to claim 10, further comprising a polarizer layer, wherein the polarizer layer is disposed on one side, facing away from the touch layer, of the thin film covering layer.

12. A method for manufacturing a flexible touch display panel, comprising:
   forming a flexible substrate;
   forming a driver layer having a plurality of thin film transistors on the flexible substrate;
   forming a light-emitting layer having a plurality of light-emitting units on one side, facing away from the flexible substrate, of the driver layer, wherein the plurality of light-emitting units each are associated with more than one of the plurality of thin film transistors, and are controlled to emit light by the more than one of the plurality of thin film transistors;
   forming an encapsulation layer on one side, facing away from the flexible substrate, of the light-emitting layer, wherein the encapsulation layer is arranged to encapsulate the light-emitting layer; and
   forming a touch layer on one side, facing away from the flexible substrate, of the encapsulation layer by ink-jet printing or coating, wherein the touch layer comprises a plurality of first touch electrodes and a plurality of second touch electrodes disposed on the side, facing away from the flexible substrate, of the encapsulation layer, wherein of the plurality of first touch electrodes each comprise a plurality of first touch electrode blocks and a plurality of first junctions for joining two adjacent first touch electrode blocks, the plurality of first touch electrodes each are strip-like and extend along a first direction, and the plurality of first touch electrodes are arranged in parallel along a second direction;
   wherein the plurality of second touch electrodes each comprise a plurality of second touch electrode blocks and a plurality of second junctions for joining two adjacent second touch electrode blocks, the plurality of second touch electrodes each are strip-like and extend along the second direction, the plurality of second touch electrodes are arranged in parallel along the first direction, and the first direction intersects the second direction;
   wherein the plurality of first junctions and the plurality of second junctions overlay in a direction perpendicular to the flexible substrate;
   wherein the plurality of first junctions each and one of the plurality of second junctions overlay in a direction perpendicular to the flexible substrate, wherein said first junction and said second junction are insulated from each other by one of a plurality of insulating pieces of an insulating layer disposed in the touch layer;
   wherein each touch electrode of the plurality of first touch electrodes and the plurality of second touch electrodes comprises a conductive polymer material;
   wherein the conductive polymer material is either a composite of silver nanowires and PEDOT:PSS or a composite of carbon nanowires and PEDOT:PSS;
   wherein a mass percent of silver nanowires or carbon nanowires in the conductive polymer material is x % and a mass percent of PEDOT:PSS is (100−x)%, wherein x=0.1~60.

13. The method for manufacturing a flexible touch display panel according to claim 12, wherein the step of forming a touch layer on one side, facing away from the flexible substrate, of the encapsulation layer by ink-jet printing or coating comprises:
   forming the plurality of first touch electrodes and the plurality of second touch electrodes on the side, facing away from the flexible substrate, of the encapsulation layer by ink-jet printing or coating;

forming the plurality of insulating pieces on one side, facing away from the flexible substrate, of the plurality of first junctions by ink-jet printing or coating, wherein each of the insulating pieces is arranged to cover one of the plurality of first junctions; and forming the plurality of second junctions on one side, facing away from the flexible substrate, of the plurality of insulating pieces by ink-jet printing or coating.

14. The method for manufacturing a flexible touch display panel according to claim 12, wherein the step of forming a touch layer on one side, facing away from the flexible substrate, of the encapsulation layer by ink-jet printing or coating comprises:

forming the plurality of second junctions on the side, facing away from the flexible substrate, of the encapsulation layer by ink-jet printing or coating;

forming the plurality of insulating pieces on one side, facing away from the flexible substrate, of each of the plurality of second junctions by ink-jet printing or coating, wherein the insulating piece is arranged to at least partially cover one of the plurality of second junctions; and forming the plurality of first touch electrodes and the plurality of second touch electrodes on the flexible substrate and on one side, facing away from the flexible substrate, of at least a part of each of the plurality of second junctions by ink-jet printing or coating, and forming each of the plurality of first junctions on one side, facing away from the flexible substrate, of one of the plurality of insulating pieces by ink-jet printing or coating.

15. The method for manufacturing a flexible touch display panel according to claim 12, further comprises:

forming an insulating covering layer on the touch layer, wherein the insulating covering layer is arranged to cover the touch layer.

16. A flexible touch display device comprising a flexible touch display panel, wherein the flexible touch display panel comprises:

a flexible substrate;

a driver layer, wherein the driver layer is disposed on the flexible substrate and comprises a plurality of thin film transistors;

a light-emitting layer, wherein the light-emitting layer is disposed on the driver layer and comprises a plurality of light-emitting units, the plurality of light-emitting units each are associated with more than one of the plurality of thin film transistors, and are controlled to emit light by the more than one the plurality of thin film transistors;

an encapsulation layer, wherein the encapsulation layer is disposed on the light-emitting layer to encapsulate the light-emitting layer; and a touch layer, wherein the touch layer is disposed on the encapsulation layer, and comprises a plurality of first touch electrodes and a plurality of second touch electrodes disposed on one side, facing away from the flexible substrate, of the encapsulation layer, wherein the plurality of first touch electrodes and the plurality of second touch electrodes are disposed on a same layer, wherein wherein the plurality of first touch electrodes each comprise a plurality of first touch electrode blocks and a plurality of first junctions for joining two adjacent first touch electrode blocks; wherein the plurality of first touch electrodes each are strip-like and extend in a first direction, and the plurality of first touch electrodes are arranged in parallel along a second direction;

wherein the plurality of second touch electrodes each comprise a plurality of second touch electrode blocks and a plurality of second junctions for joining two adjacent second touch electrode blocks, wherein the plurality of second touch electrodes each are strip-like and extend in the second direction, and the plurality of second touch electrodes are arranged in parallel along the first direction, wherein the first direction intersects the second direction;

wherein the plurality of first junctions each and one of the plurality of second junctions overlay in a direction perpendicular to the flexible substrate, wherein said first junction and said second junction are insulated from each other by one of a plurality insulating pieces of an insulating layer disposed in the touch layer;

wherein the plurality of first touch electrodes and the plurality of second touch electrodes consist of a conductive polymer material formed by ink-jet printing or coating;

wherein the conductive polymer material is either a composite of silver nanowires and PEDOT:PSS or a composite of carbon nanowires and PEDOT:PSS; and wherein a mass percent of silver nanowires or carbon nanowires in the conductive polymer material is x % and a mass percent of PEDOT:PSS is (100−x)%, wherein x=0.1~60.

* * * * *